United States Patent [19]

Brackman

[11] 3,880,952

[45] Apr. 29, 1975

[54] PHOTODEGRADABLE POLYETHYLENE COMPOSITION CONTAINING POLY(4-METHYLPENTENE) AND A PHOTOSENSITIZER

[75] Inventor: Derek Samuel Brackman, Stanmore, England

[73] Assignee: Imperial Chemical Industries Limited, London, England

[22] Filed: May 26, 1972

[21] Appl. No.: 257,142

[30] Foreign Application Priority Data
June 10, 1971   United Kingdom............... 19890/71

[52] U.S. Cl........... 260/878 R; 260/23; 260/32.8 A; 260/45.75 R; 260/DIG. 43
[51] Int. Cl. ............................................ C08f 45/66
[58] Field of Search........ 260/23, 45.75 R, DIG. 43, 260/45.9, 878 R, 32.8 A

[56] References Cited
UNITED STATES PATENTS

| | | | |
|---|---|---|---|
| 2,680,756 | 6/1954 | Pausom............................... | 260/439 |
| 3,111,533 | 11/1963 | Ecke ............................ | 260/45.75 R |
| 3,269,963 | 8/1966 | Ilgeman et al. ............... | 260/45.75 R |
| 3,341,357 | 9/1967 | Field............................ | 260/DIG. 43 |
| 3,575,904 | 4/1971 | Clarke et al. .......................... | 260/23 |
| 3,592,792 | 7/1971 | Newland et al....................... | 260/41 |
| 3,592,792 | 7/1971 | Howland.......................... | 260/45.75 |

FOREIGN PATENTS OR APPLICATIONS

| | | |
|---|---|---|
| 2,007,965 | 9/1970 | Germany |
| 4,638,687 | 11/1971 | Japan |
| 228,938 | 2/1968 | U.S.S.R. |

OTHER PUBLICATIONS

Polymer Letters Edition, Vol. 11, pp. 351–355 (1973).
Chem. Abstracts, Vol. 68, 79356f, 79357g and 79358h (1968).
"Autoxidation and Autoxidants," ed. Lundberg, Interscience Pub., N.Y., QD 281.09 L8 C.3, pp. 924–926.
Chemical & Engineering News Vol. 39 No. 51, Sept. 18, 1961.
Chem. & Ind. (London), Winslow et al., 1465, 1963.
Chemical & Eng. News, May 11, 1970, Guillot.

Primary Examiner—Eugene C. Rzucidlo
Attorney, Agent, or Firm—Cushman, Darby & Cushman

[57] ABSTRACT

Polyethylene contains poly(4-methylpentene-1) and a photosensitiser such as iron stearate or p-lauryl acetophenone. The combination of the two additives renders the composition more liable to photodegradation than when either additive is used alone.

9 Claims, No Drawings

PHOTODEGRADABLE POLYETHYLENE COMPOSITION CONTAINING POLY(4-METHYLPENTENE) AND A PHOTOSENSITIZER

This invention relates to polyethylene compositions.

The use of disposable polyethylene wrappings, containers and the like and their subsequent discarding, either intentionally or accidentally, has led to the problem of polyethylene litter. This invention relates to a polyethylene composition the use of which can alleviate this problem.

According to the invention a photodegradable polyethylene composition contains, in addition to the polyethylene, poly(4-methylpentene-1) and a photosensitiser. Examples of well known photosensitisers are aromatic ketones, for example benzophenone or p-lauryl acetophenone, and compounds of transition metals, especially those of variable valency, which may be inorganic (for example metal chlorides) or organic, e.g. the alkyl benzoylacetates (in which the alkyl group contains 8–18 carbon atoms), of manganese, cobalt, chromium, iron, nickel, zinc, copper and vanadium. Iron stearates and the ferrocenes are particularly good photosensitisers. Both high density and low density polyethylene can be photosensitised according to the invention.

Suitable concentrations for the additives are:
  0.01% to 10%, preferably 0.1 to 2%, for the poly(4-methylpentene-1), and
  0.001% to 2%, preferably 0.01% to 1%, for the photosensitiser. (All the percentages are by weight based on the total composition).

The invention includes wrappings (e.g. wrapping film), containers and string made of the polyethylene compositions described above. The following are examples of containers: bags, sacks, boxes, cartons, bottles, sachets, cups and cartridge cases.

The invention also includes an item of merchandise packed in a material made of a polyethylene composition as described above.

In addition to the polymer and the prodegradant a composition according to the invention may also include other additives which are conventionally incorporated in thermoplastics polymer compositions, for example they may incorporate dyes or pigments, anti-blocking agents, slip agents, anti-static agents, U.V. stabilisers, and antioxidants, i.e, additives which stabilise the composition during processing and/or during use (i.e. after processing has finished).

Several compositions according to the invention will now be described by way of example.

EXAMPLE 1

Two compositions according to the invention are designated by the code PE-A and PE-B in Table 1. Table 1 also gives the constitution of three control compositions which omitted one of the additives.

TABLE 1

|  | poly(4-methyl-pentene-1) % | p-lauryl acetophenone |
|---|---|---|
| PE-A | 1 | 0.1 |
| PE-B | 10 | 0.1 |
| Control-X | 1 | — |
| Control-Y | 10 | — |
|  | poly(4-methyl-pentene-1) % | p-lauryl acetophenone |
| Control-Z | — | 0.1 |

All the compositions specified in Table 1 were prepared by dry mixing the ingredients and gelling on a mill at 160° C for 10 minutes. The crepe was compression moulded using 5 minutes preheat at 160° C, 3 minutes under 20 tons/square inch pressure followed by rapid cooling to 25° C. The result was a film 0.005 inches thick. A film was similarly prepared from the low density polyethylene without any additives.

Samples 1 cm × 3 cm were cut from the pressed sheet and subjected to U.V. irradiation using a 500 watt Hanovia 509/10 medium pressure U.V. arclight of which the output was filtered through 0.5 mm Pyrex to remove radiation below 290 nm. The samples were rotated around the lamp at a distance of 10 centimetres 14 times per minute.

The samples were inspected and tested for flex-crack failure at intervals of 8–16 hours until embrittlement occurred. Embrittlement was determined by the occurrence of cracking when subjected to a bending stress. The time to embrittlement was taken as a measure of the performance of the additive, shorter times indicating better peformance.

The performance of the blank, Control-X and Control-Z could not be distinguished in this test. All of these compositions had an endurance of about 400 hours.

Similarly the performance of PE-A, PE-B and Control-Y could not be distinguished in this test and all of these compositions had an endurance of about 225 hours.

The compositions according to the invention are better than the blank, Control-X and Control-Z in that they have about half the endurance. On the other hand PE-A achieves the same endurance as Control-Y even though the total additive concentration of PE-A is about one-tenth that of Control-Y.

EXAMPLE 2

High density polyethylene was blended with 1% wt of poly(4-methylpentene-1), 0.1% wt of benzophenone and also with 0.1% wt of benzophenone and 1% wt of poly(4-methylpentene-1). The three mixtures, as well as pure high density polyethylene, were made into film 60 microns thick. These four films were exposed out of doors at Welwyn Garden City and the elongation at break was measured after 4, 8 and 12 weeks. The results are given in Table 2.

TABLE 2

| Composition | | % Elongation after | | |
|---|---|---|---|---|
| Benzophenone | poly(4-methyl-pentene-1) | 4 weeks | 8 weeks | 12 weeks |
| — | — | 730 | 730 | 730 |
| — | 1% | 730 | 570 | 30 |
| 0.1% | 1% | 40 | 20 | 10 |
| 0.1% | — | 850 | 680 | 20 |

The results of Table 2 show that poly (4-methylpentene-1) and benzophenone used alone cause a rapid reduction of the elongation at break to about 30% to 20% after 8 to 12 weeks' exposure. When both poly(4-methylpentene-1) and benzophenone are present the elongation at break drops to 40% after 4 weeks' exposure. The low value drops even further to about 10% after 12 weeks' exposure.

EXAMPLE 3

Two compositions according to the invention were prepared from iron stearate or dipivalyl ferrocene, $(CH_3)_3C.CO.(C_5H_3FeC_5H_3).CO.C(CH_3)_3$, poly(4-methylpentene-1) and low density polyethylene. The ingredients were mixed and made into films which were exposed out of doors at welwyn Garden City. As well as the two compositions, two blanks were also exposed.

| Component | Film A | Blank A | Film B | Blank B |
|---|---|---|---|---|
| Iron Stearate | 0.1% | 0.1% | — | — |
| Dipivalyl ferrocene | — | — | 0.1% | 0.1% |
| Poly(4-methylpentene-1) | 1% | — | 1% | — |

In all cases the percentage is by weight based on the total composition and each composition contains low density polyethylene to make 100%.

Table 3 gives the dates for the start and end of the period of exposure as well as the duration (in days) needed to cause embrittlement.

TABLE 3

| Film | Start | Exposure End | Duration(days) |
|---|---|---|---|
| Film A | 14 May 71 | 15 October 71 | 154 |
| Blank A | 22 May 71 | 29 October 71 | 185 |
| Film B | 1 June 71 | 27 July 71 | 56 |
| Blank B | 22 April 71 | 20 August 71 | 115 |

The results given in Table 3 show that the presence of the poly(4-methylpentene-1) increases the effect of the photosensitiser. When only 1% of poly(4-methylpentene-1) was present in low density polyethylene (i.e., with the photosensitiser omitted) embrittlement did not occur within a year's exposure.

I claim:

1. A photodegradable polyethylene composition which contains 0.01 to 2% by weight of poly(4-methylpentene-1) and 0.001% to 2% by weight of a photosensitiser selected from the group consisting of aromatic ketones and compounds of transition metals.

2. A photodegradable polyethylene composition according to claim 1, in which the concentration of the poly(4-methylpentene-1) is 0.1 to 2% by weight.

3. A photodegradable polyethylene composition according to claim 1, in which the concentration of the photosensitiser is 0.01 to 1% by weight.

4. A photodegradable polyethylene composition as claimed in claim 1, in which the photosensitiser is p-lauryl acetophenone.

5. A wrapping film which is formed of a photodegradable polyethylene composition according to claim 1.

6. A container made of a photodegradable polyethylene composition according to claim 1.

7. String which is made of a photodegradable polyethylene composition according to claim 1.

8. An article of merchandise packed in a material made of a polyethylene composition as claimed in claim 1.

9. A photodegradable polyethylene composition which contains 0.1 to 2% by weight of poly(4-methylpentene-1) and as a photosensitiser 0.01 to 1% by weight of p-lauryl acetophenone.

* * * * *